United States Patent
Nagarathinam (10) Patent No.: US 11,316,602 B2
(45) Date of Patent: Apr. 26, 2022

(54) MESSAGE COLLISION REDUCTION IN UNICABLE SYSTEMS

(71) Applicant: ARRIS Enterprises LLC, Suwanee, GA (US)

(72) Inventor: Yuvaraj Nagarathinam, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/919,910

(22) Filed: Jul. 2, 2020

(65) Prior Publication Data
US 2021/0013980 A1    Jan. 14, 2021

Related U.S. Application Data

(60) Provisional application No. 62/871,999, filed on Jul. 9, 2019.

(51) Int. Cl.
*H04H 40/90* (2008.01)
*H04B 7/185* (2006.01)
(Continued)

(52) U.S. Cl.
CPC ......... *H04H 40/90* (2013.01); *H04B 7/18513* (2013.01); *H04H 20/63* (2013.01); *H04N 21/6143* (2013.01)

(58) Field of Classification Search
CPC ... H03J 1/0091; H04B 7/18513; H04H 20/63; H04H 40/90; H04H 60/15; H04H 60/41; H04H 60/80; H04N 5/445; H04N 5/50; H04N 7/10; H04N 7/106; H04N 7/20; H04N 21/258; H04N 21/43615;
(Continued)

(56) References Cited

U.S. PATENT DOCUMENTS

| | | | | |
|---|---|---|---|---|
| 5,959,592 A | * | 9/1999 | Petruzzelli | H01Q 1/247 725/68 |
| 7,248,831 B1 | * | 7/2007 | Taskin | H04L 41/0654 455/420 |
| 2017/0344500 A1 | | 11/2017 | Mstowski | |

FOREIGN PATENT DOCUMENTS

| | | | | |
|---|---|---|---|---|
| EP | 2863560 A1 | | 4/2015 | |
| EP | 2911324 B1 | * | 5/2019 | H04L 12/40 |

OTHER PUBLICATIONS

Guy Wilkinson et al.,Digital Satellite Equipment Control—Bus Functional Specification, Paris, France, Feb. 25, 1998, 29 pages.

* cited by examiner

*Primary Examiner* — Ankur Jain
(74) *Attorney, Agent, or Firm* — Chernoff, Vilhauer, McClung & Stenzel, LLP (57) ABSTRACT

In some embodiments, a first receiver in a plurality of receivers receives a signal via a unicable line from a satellite transmission. The unicable line connects the plurality of receivers to an interface that receives multiple inputs from a satellite reflector dish. The first receiver generates a first unicable message for delivery on the unicable line and detects a characteristic on the unicable line to determine whether a second unicable message from a second receiver in the plurality of receivers is being sent on the unicable line. When the second unicable message is detected, the first receiver delays transmission of the first unicable message by a time period. When the second unicable message is not detected, the first receiver transmits the first unicable message on the unicable line.

18 Claims, 6 Drawing Sheets

(51) Int. Cl.
*H04H 20/63* (2008.01)
*H04N 21/61* (2011.01)

(58) Field of Classification Search
CPC ........... H04N 21/4367; H04N 21/4383; H04N 21/44008; H04N 21/44209; H04N 21/4425; H04N 21/4882; H04N 21/6143; H04N 21/6371; H04L 12/413
See application file for complete search history.

MESSAGE COLLISION REDUCTION IN UNICABLE SYSTEMS

CROSS-REFERENCES TO RELATED APPLICATIONS

This application claims priority to U.S. Provisional Patent Application No. 62/871,999 filed on Jul. 9, 2019, entitled "MESSAGE COLLISION REDUCTION IN UNICABLE SYSTEMS", the disclosure of which is hereby incorporated by reference.

BACKGROUND

In a satellite set top box installation, a front end of the set top box (e.g., every tuner-demodulator) requires a dedicated low noise block down (LNB) converter in a signal reflector (e.g., satellite dish). With the introduction of quad-LNBs, the need for multiple signal reflectors is eliminated. However, a four front-end set top box requires four cables to be connected from the satellite signal reflector dish to the set top box. The number of cables creates an undesired cluttering of cables inside and outside the premises. To overcome the use of this many cables, a unicable setup may be used that employs a unicable device (e.g., a switch/a unicable LNB) and unicable set top box where a single cable is connected between the unicable device and multiple tuners in a set-top-box or multiple set top boxes.

The set top boxes can send control signals to the unicable device without the knowledge of other set top boxes sending control signals. Thus, there is a chance of collision among the control signals from different set top boxes to the switch. When a collision occurs, the unicable device cannot decode any of the conflicting control signals and these control signals are not processed. When each of the conflicting set top boxes detects the failure, the set top boxes that experienced the collision both wait a random delay to then repeat the same control signal. If a subsequent collision occurs, the set top boxes attempt to repeat the transmission a total of five times before experiencing a failure. When this failure occurs, if a program was being requested by the control signal, then the program is not displayed and an error may result, such as the television may display a blank screen or a no-signal banner.

DETAILED DESCRIPTION

Described herein are techniques for a unicable system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

In a unicable system where a single cable interface (SCIF) is used to connect a unicable (e.g., a single cable) to multiple receivers (e.g., set top boxes), a process to detect and avoid collisions is provided. A receiver detects if one of the other receivers connected to the unicable is transmitting a message, such as a unicable message, and avoids a collision with a message being currently transmitted. In some embodiments, the receiver senses a characteristic on the unicable line, such as a voltage on the unicable line or a tone. In some embodiments, when a receiver is transmitting a message on the unicable line, the voltage on the line switches from a first voltage (e.g., 13 volts (V)) to a second voltage (e.g., 18V). Then, after a delay (td), the receiver transmits the message and the message is only sent with the unicable line at 18V.

In some embodiments, the receiver senses if the unicable line is available by checking the voltage level of the unicable line before initiating a communication on the unicable line. If the voltage level meets (e.g., is greater than) a threshold, such as 17V, then the receiver determines that the unicable line is busy and thus does not send the unicable message. The receiver can then attempt to send the unicable message at another time, such as after a set delay of 50 ms. When the voltage level on the unicable line does not meet the threshold (e.g., is less than), then the receiver can initiate the unicable message, such as by increasing the voltage from the first voltage level to the second voltage level, and then transmitting the unicable message.

System Overview

Figure 1:
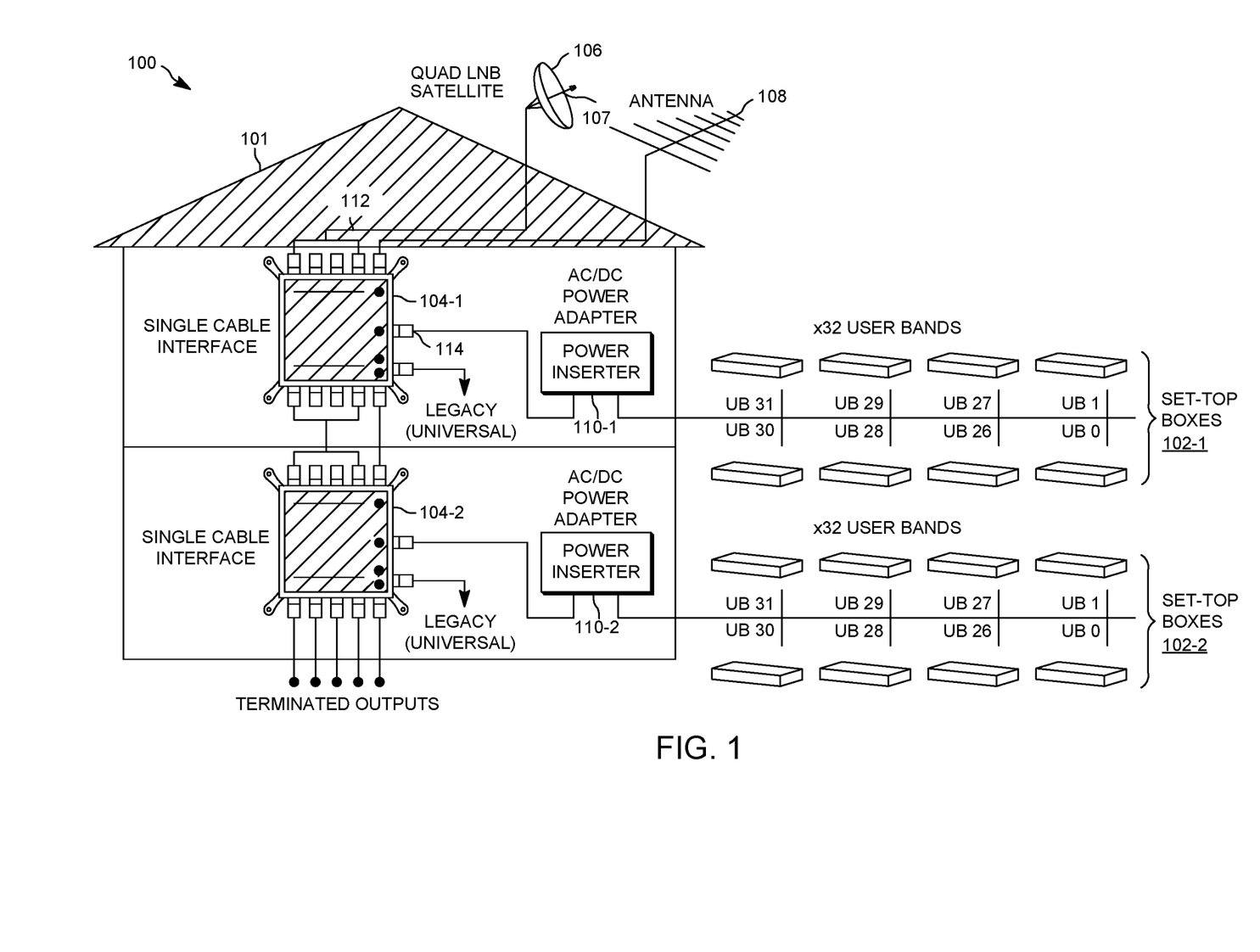
FIG. 1 depicts a simplified system for a unicable system according to some embodiments.

FIG. 1 depicts a simplified system 100 for a unicable system according to some embodiments. System 100 includes receivers 102, single cable interfaces 104, and a reflector dish (e.g., satellite) 106, and LNB (Low Noise Block) 107, that are included in a premises 101. Additionally, an antenna 108 may be used to provide legacy television signals or over-the-air signals. An alternative setup can combine single cable interfaces 104 and LNB 107, into a single device which resides in the reflector dish 106.

Satellite dish 106 may reflect signals from a satellite orbiting the Earth, such as satellite signals that include content, to low noise block converters (LNB) 107, to receive the signals. In some embodiments, four LNBs may be used, but other numbers of LNBs may be used. Each LNB from satellite dish 106 may include a cable that connects to single cable interface 104. For example, a single cable from each LNB connects to a connector of single cable interface 104. The connector may be a connector of single cable interface 104. In an alternative setup integrated LNB and single cable interface device called unicable LNB device outputs a single or multiple unicable outputs, which outputs signals to multiple receivers 102.

Single cable interface 104 receives signals from satellite dish 106 via multiple cables and outputs the signals via a single cable (e.g., unicable) to multiple receivers 102. For example, the four cables are connected to single cable interface 104 at 112 and the unicable is connected to single cable interface 104 at 114. Signal cable interface 104 may be embedded in a switch or in one of the LNBs.

In system 100, two single cable interfaces 104-1 and 104-2 are used, but any number of single cable interfaces may be used. In system 100, single cable interface 104-1 is connected directly to satellite dish 106. Then, single cable interface 104-2 is connected to single cable interface 104-1 to receive the same signals from satellite dish 106. Single cable interface 104-1 is connected to a first group of receivers 102-1 and single cable interface 104-2 is connected to a second group of receivers 102-2. Each group of receivers may operate as a separate group in the same frequency spectrum. Receivers 102 and single cable interface 104 will be generally discussed, and the discussion could be applied to either receivers 102-1 or 102-2 and single cable interface 104-1 or 104-2.

The unicable may be connected to a power inserter 110-1 or 110-2. The power inserter is used to insert power to drive the single cable interface device, but it is not needed in all cases.

Receivers 102 may be set top boxes that are configured to receive and process the signals to allow content to be displayed. Receivers 102 may be assigned different user bands based on frequency. For example, different user bands are assigned to different receivers, such as user band #0, user band #1 . . . , user band #31 are assigned to thirty two receivers 102. Each user band is associated with a different frequency band and each receiver 102 receives signals via satellite dish 106 from single cable interface 104 in its assigned frequency band.

Figure 2:
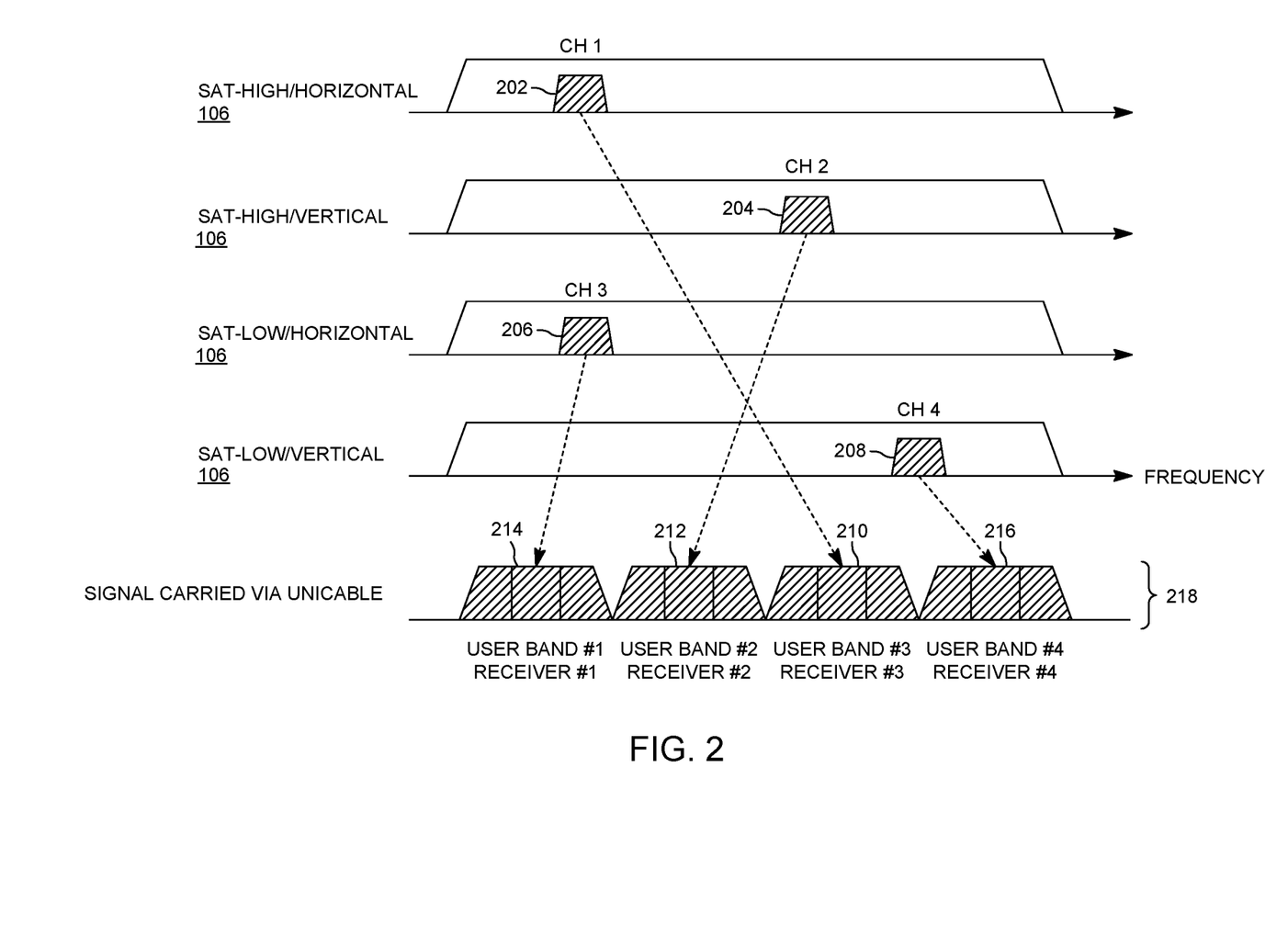
FIG. 2 depicts an example of user bands and how channels from different quadrants can be transposed to user band frequencies according to some embodiments.

FIG. 2 depicts an example of user bands and how channels from different quadrants can be transposed to user band frequencies according to some embodiments. The signals may be received from satellite 106 in different quadrants based on receiving the signal via the four LNBs. In some embodiments, the four quadrants may be high/horizontal, high/vertical, low/horizontal, and low/vertical; however, different numbers of quadrants may be provided based on the number of LNBs that receive the satellite signal. The signals may be received at different frequencies in the quadrants. For example, a channel #1 at 202 is received at a first frequency in the high/horizontal quadrant; a channel #2 at 204 is received at a second frequency in the high/vertical quadrant; a channel #3 at 206 is received in the low/horizontal quadrant at a third frequency; and a channel #4 at 208 is received at a fourth frequency in the low/vertical quadrant. It is noted that other channels may be received, but are not shown. For example, each quadrant may include multiple channels that are received at different frequencies where a channel received at the same frequency in a different quadrant does not interfere with another channel received at the same frequency in another quadrant. Each channel may be carrying different content, such as content from a lineup of programs.

Respective user bands #1, #2, #3, and #4 for four receivers #1, #2, #3, and #4 are shown at 218. Each user band is associated with a different frequency of a signal being sent though the unicable. Accordingly, within each user band, a signal may be carried to a respective receiver. Accordingly, each receiver can receive a requested channel in a respective user band. For example, receiver #1 is receiving channel #3 at 214; receiver #2 is receiving channel #2 at 212; receiver #3 is receiving channel #1 at 210; and receiver #4 is receiving channel #4 at 216.

The unicable may be a single coaxial cable with a multi-master to client architecture, which means multiple receivers 102 can communicate with single cable interface 104. Thus, collisions may occur between unicable messages issued by different receivers 102 within a group. For example, the group of receivers 102-1 may transmit unicable messages to single cable interface 104-1 that may collide and the group of receivers 102-2 may transmit unicable messages to single cable interface 104-2 that may collide. The unicable message may be a control message from receiver 102 to single cable interface 104 that request some action to be performed, such as a channel change request for to single cable interface 104 to switch the channel being switched in a receiver's user band. In some embodiments, the unicable signal may be a digital satellite equipment control bus (DiSEqC) signal. The following will describe the process to avoid collisions according to some embodiments.

Unicable Message

Figure 3A:
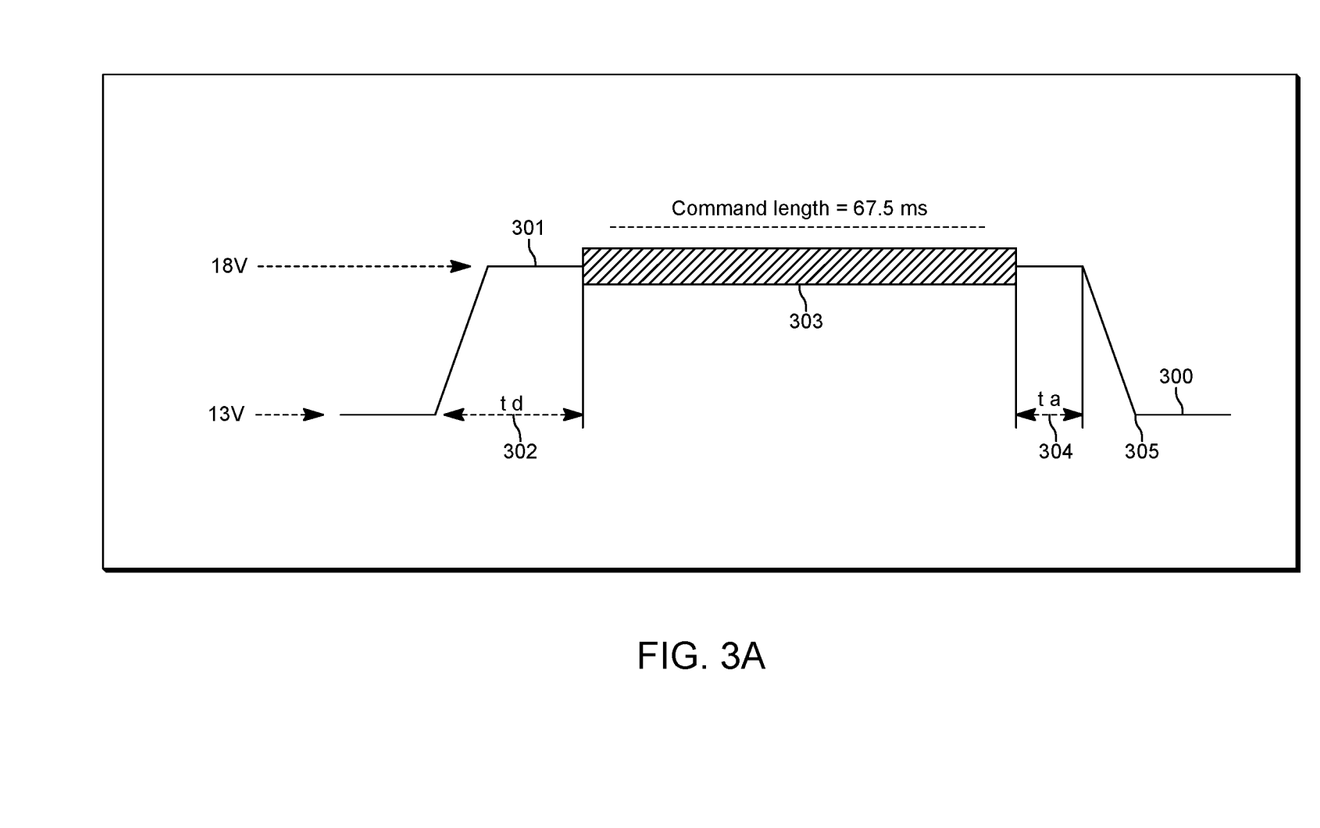
FIG. 3A shows an example of the unicable message format according to some embodiments.

The following will describe the unicable message format and the process to avoid collisions according to some embodiments. FIG. 3A shows an example of the unicable message format according to some embodiments. A receiver 102 may send a signal 300 for different reasons, such as to send a control message with a command to single cable interface 104. In some embodiments, receiver 102 may receive an input from a user, such as changing a channel, and receiver 102 sends a unicable message to single cable interface 104 to request the channel. The message is sent from receiver 102 via the unicable to a connector at single cable interface 104.

In some embodiments, when no unicable message is being sent by any receiver 102 on the unicable, the voltage level on the unicable is around first voltage level. When a receiver 102 wants to send a unicable message on a unicable line, receiver 102 pulls the voltage level from substantially around a range of 12.5 V to 14 V to a second level of substantially around a range of 17 V to 19 V at 301. The ranges of voltages at the first level and the second level may vary slightly, but are separated by a distinct difference in voltage level such receiver 102 transmits at a voltage level that is greater than 17 V.

Receiver 102 generates a high DC level upon which a control signal is added. After waiting a delay td at 302 such that the voltage on the unicable line can increase to the desired DC level, receiver 102 can transmit the unicable message at 303. The control signal may last a duration of time to send the command, such as 67.5 milliseconds (ms). For shorter control messages the duration can be lesser than 67.5 millseconds (ms). Then, after transmitting the unicable message, receiver 102 waits a time to at 304, and then pulls the voltage level from the second level of around 18 V to the first level of around 13 V. After sending the unicable message, receiver 102 returns to a mode in which it generates a low DC level onto the unicable line at 305 of around 13 V. In some embodiments, the rise time and set up time td may be greater than 4 ms and less than 22 ms, the time to transmit the unicable message is between 64 ms and 67.5 ms, then the wait time and the fall time is greater than 2 ms and less than 60 ms. The maximum time to transmit a unicable message is 129.5 ms.

The following will describe an example of when a collision occurs when not using the collision detection process and then an example of the message transmission process to avoid conflicts according to some embodiments.

Figure 3B:
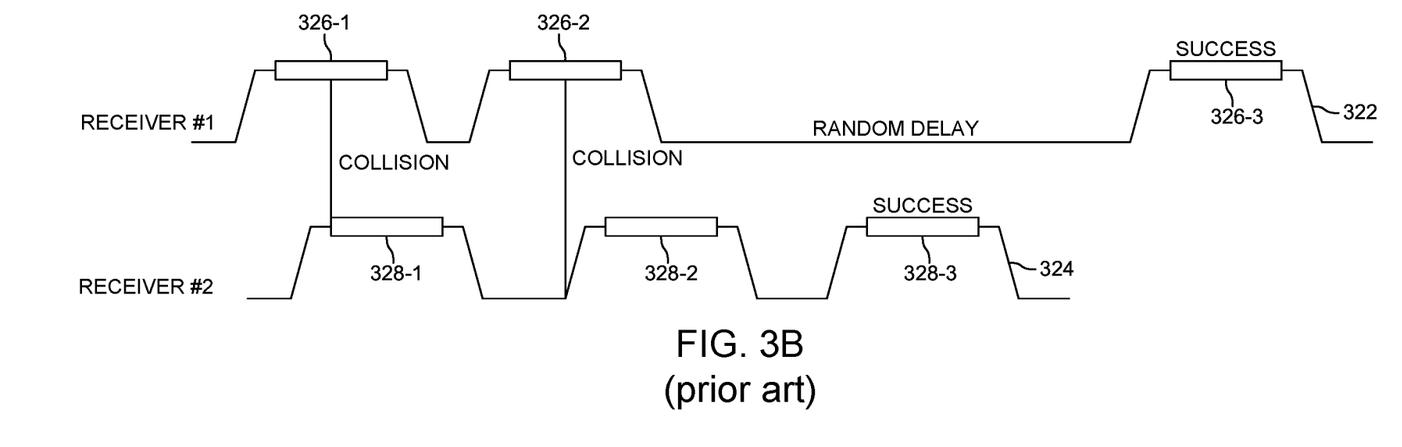
FIG. 3B shows a receiver #1 and a receiver #2 that experience a conflict when transmitting on the unicable line according to some embodiments.

FIG. 3B shows a conventional process when receiver #1 and a receiver #2 that experience a conflict when transmitting on the unicable at 322 and 324, respectively. A receiver #1 transmits a first unicable message at 326-1. While receiver #1 is transmitting the first unicable message, a second receiver #2 transmits a second unicable message at

328-1. This results in a collision as both unicable messages are transmitted on the same unicable line at the same time.

After experiencing the collision, both receiver #1 and receiver #2 wait a random amount of delay and then attempt to transmit the unicable messages again. For example, receiver #1 attempts to transmit the unicable message again at 326-2. However, receiver #2 attempts to transmit its unicable message again at 328-2, which results in another collision. Then, at 328-3, receiver #2 attempts to transmit the unicable message again and successfully transmits this message because receiver #1 is not transmitting its unicable message at this time. Then, after a random delay, receiver #1 attempts to transmit its unicable message at 326-3, which is successful because receiver #2 is not transmitting on the unicable line at this time (or any other receiver). Accordingly, in the above sequence, both receiver #1 and receiver #2 experienced multiple collisions before a successful transmission of their unicable message.

Figure 3C:
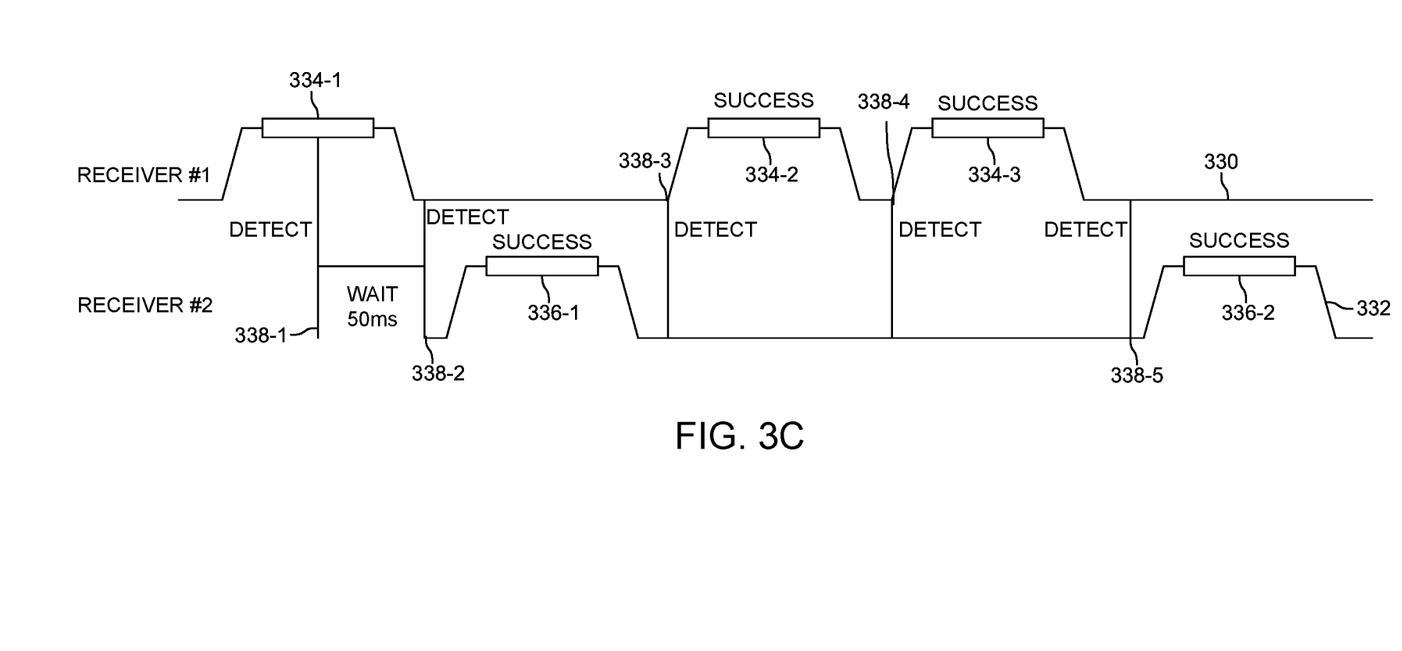
FIG. 3C depicts a unicable message process that avoids collisions when transmitting on the unicable line according to some embodiments.

FIG. 3C depicts a unicable message process that avoids collisions when transmitting on the unicable line at 330 and 332, respectively, according to some embodiments. A receiver #1 transmits a first unicable message at 334-1. Instead of attempting to transmit its unicable message, receiver #2 first detects whether or not another receiver is already transmitting a unicable message on the unicable line at 338-1. In this example, receiver #2 detects that receiver #1 is already transmitting on the unicable line based on detecting a characteristic on the unicable line, such as the voltage level or a tone on the unicable line. After detecting that the unicable line is busy, receiver #2 waits a time period before attempting to transmit on the unicable line. In some embodiments, the wait may be a set time, such as 50 ms to perform the detection again. However, other time periods may be used. A 50 ms time period may be used because the entire unicable message may be around 129.5 ms and thus a wait time of 50 ms to perform another detection may allow receiver #2 to start transmission of its unicable message as soon as possible after the ending of the unicable message sent by receiver #1. Accordingly, after a wait of 50 ms, receiver #2 detects whether or not another receiver is transmitting on the unicable line at 338-2. In this case, another receiver, such as receiver #1, is not transmitting on the unicable line and receiver #2 successfully transmits a unicable message on the unicable line at 336-1.

Receiver #1 then wants to transmit a second unicable message on the unicable line and detects whether or not another receiver, such as receiver #2 or any other receiver in the group, is transmitting on the unicable line at 338-3. In this example, receiver #2 is not transmitting on the unicable line, and at 334-2, receiver #1 successfully transmits a unicable message.

Receiver #1 then wants to transmit a third unicable message and detects whether or not another receiver, such as receiver #2, is transmitting on the unicable line at 338-4. Receiver #2 is not transmitting on the unicable line at this time, and receiver #1 successfully transmits the unicable message at 334-3.

Receiver #2 then wants to transmit a second unicable message on the unicable line and detects whether or not any other receivers, such as receiver #1, is transmitting on the unicable line at 338-5. In this example, receiver #1 is not transmitting on the unicable line at this time, and receiver #2 successfully transmits the unicable message at 336-2.

Accordingly, in contrast to a process that does not detect for collisions, receivers using the collision detection process did not experience any collisions on the unicable line. When a receiver detected that the unicable line is busy, the receiver waited a time period to check again. This resulted in no collisions, but also receivers were able to transmit their control signals faster than the convention process that experienced collisions because multiple collisions may occur and random delays may be longer than 50 ms.

Collision Detection

Figure 4:
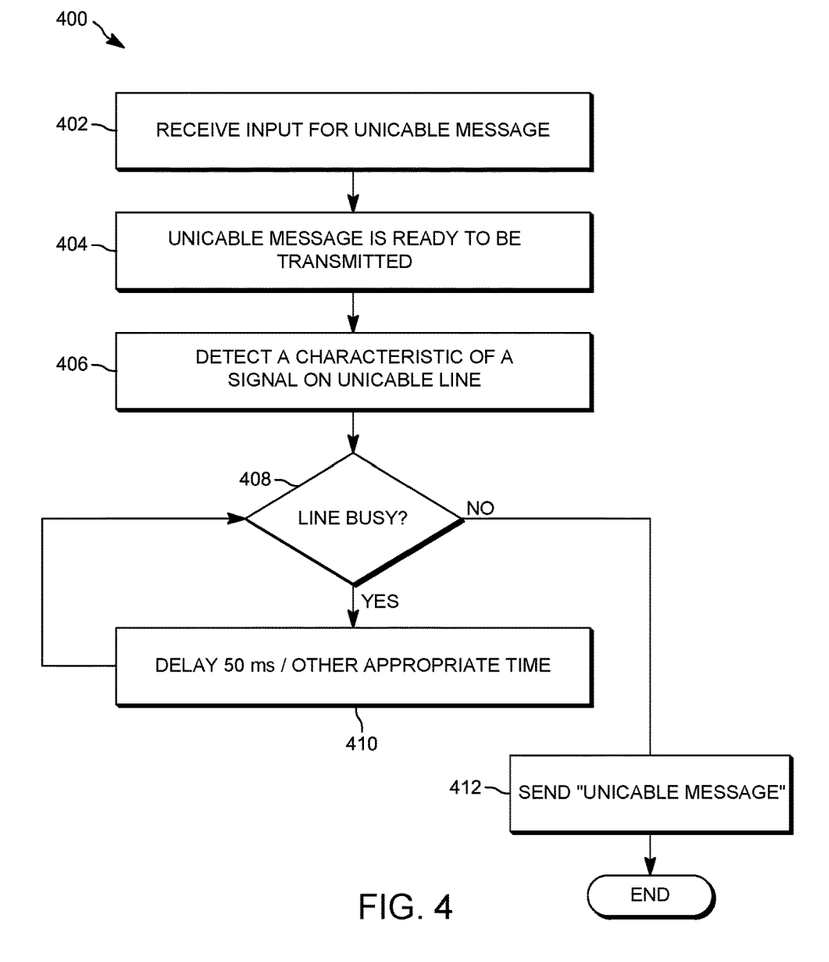
FIG. 4 depicts a simplified flowchart of a method for detecting collisions according to some embodiments.

FIG. 4 depicts a simplified flowchart 400 of a method for detecting collisions according to some embodiments. At 402, receiver 102 receives an input for a unicable message. For example, receiver 102 may receive an input from a user for a channel change request; however, other types of inputs may also be received that cause receiver 102 to generate a command for a unicable message. Alternatively, receiver 102 may generate a unicable message without receiving an input, e.g., sending periodic keep-alive messages. At 404, receiver 102 generates a unicable message based on the input, and then determines when the unicable message is ready to be transmitted.

Upon detecting the unicable message is ready, at 406, receiver 102 detects a characteristic on the unicable line. As discussed above, receiver 102 may detect a voltage or tone of a signal on the unicable line. Various implementations may be used to detect the voltage or tone, some of which will be described below. At 408, receiver 102 determines if the unicable line is busy. That is, another receiver may be transmitting on the unicable line. In some embodiments, if the voltage meets a threshold, such as the voltage is greater than 17V, then receiver 102 determines that the unicable line is busy. The threshold of 17 V is used because the range on the unicable line may be from 17 V to 19 V when another receiver is transmitting on the unicable line, and once the voltage on the unicable line goes past 17 V, then another receiver 102 is transmitting on the unicable line. If the unicable line is busy, then at 410, receiver 102 waits a set time, such as 50 ms, to perform another detection at 408. This process may continue until the unicable line is detected as not busy. The process may be repeated a number of times, such as five times or any other number of times that may be determined based on the retry interval, which may be 50 ms or another appropriate value, and the time out value required to respond back to the application to display a no-signal banner or blank screen or any other notification on a user interface. If the unicable line is not busy, then at 412, receiver 102 sends the unicable message.

Figure 5:
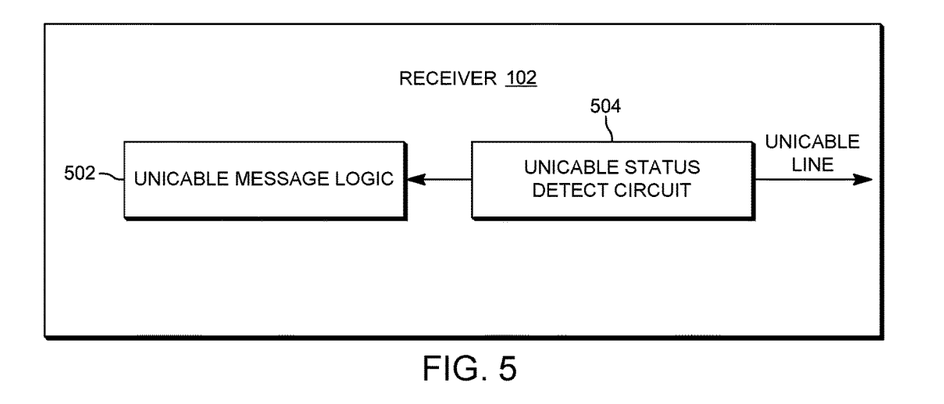
FIG. 5 depicts a more detailed example of a receiver according to some embodiments.

FIG. 5 depicts a more detailed example of receiver 102 according to some embodiments. Receiver 102 includes unicable message logic 502 and a unicable status detect circuit 504 according to some embodiments. Unicable message logic 502 may be a computer chip, or software, that is responsible for generating and transmitting the unicable message. Unicable message logic 502 may receive input that indicates a unicable message should be sent and then generates a unicable message.

Unicable status detect circuit 504 may detect a characteristic on the unicable line, such as the voltage on the unicable line. Although a circuit is discussed, unicable status detect circuit 504 may also be implemented in software. In other embodiments, unicable status detect circuit 504 may detect a tone on the unicable line. For example, when a unicable message is being transmitted, a tone is present on the line, such as a 22 kHz tone. Tone detection may be performed using a LNB controller chip that can detect the presence of 22 KHz tone. Alternatively, a circuit can be used to detect the presence of 22 KHz tone.

In some embodiments, unicable status detect circuit 504 may measure the voltage on the unicable line using any type of logic. For example, unicable status detect circuit 504 may be a comparator circuit that receives the voltage from the unicable line as an input. The output of the comparator is input into unicable message logic 502. The comparator may set the output to a value of high (e.g., a value of 1), or another value, to indicate that the voltage on the unicable line is greater than the threshold voltage. This indicates to unicable message logic 502 that the unicable line is busy. The comparator may set the output to a value of low (e.g., a value of 0), or another value, to indicate that the voltage on the unicable line is less than the threshold voltage. When unicable message logic 502 determines that a unicable message is to be sent, then unicable message logic 502 checks the input from unicable status detect circuit 504 to determine whether the unicable line is busy or not. If the output of the comparator is high, then unicable message logic 502 determines that the unicable line is busy.

In some embodiments, unicable status detect circuit 504 may detect a tone, for example, a 22 KHz tone, on the unicable line using any type of logic. For example, unicable status detect circuit 504 may be an LNB control chip that receives the tone, such as the 22 KHz tone from the unicable line, as an input. The output of the LNB control chip is input into unicable message logic 502. The LNB control chip may set the output to a value of high (e.g., a value of 1), or another value, to indicate the availability of the tone in the line. This indicates to unicable message logic 502 that the unicable line is busy. The 22 KHz detector circuit may set the output to a value of low (e.g., a value of 0), or another value, to indicate that there is no tone, such as the 22 KHz tone in the unicable line. When unicable message logic 502 determines that a unicable message is to be sent, then unicable message logic 502 checks the input from unicable status detect circuit 504 to determine whether the unicable line is busy or not. If the output of the tone detector is high, then unicable message logic 502 determines that the unicable line is busy.

Conclusion

Accordingly, receivers 102 include a detection process that can avoid collisions on a unicable line. By detecting whether or not another receiver 102 is transmitting on the unicable line, collisions may be avoided. Also, with a set delay, such as 50 ms, receiver 102 that detects the collision may start transmitting soon after the collision clears. This is, in contrast to the random delay used by conventional systems in which when a collision occurs, both receivers 102 institute a random delay to attempt to re-transmit the unicable message. Thus, conventionally, when a collision occurs, the receiver that is already transmitting a control signal has its unicable message corrupted and thus both receivers have to re-transmit the unicable messages. The detection method avoids collisions but also transmits the unicable messages faster than the conventional process when a line is detected as busy.

System

Figure 6:
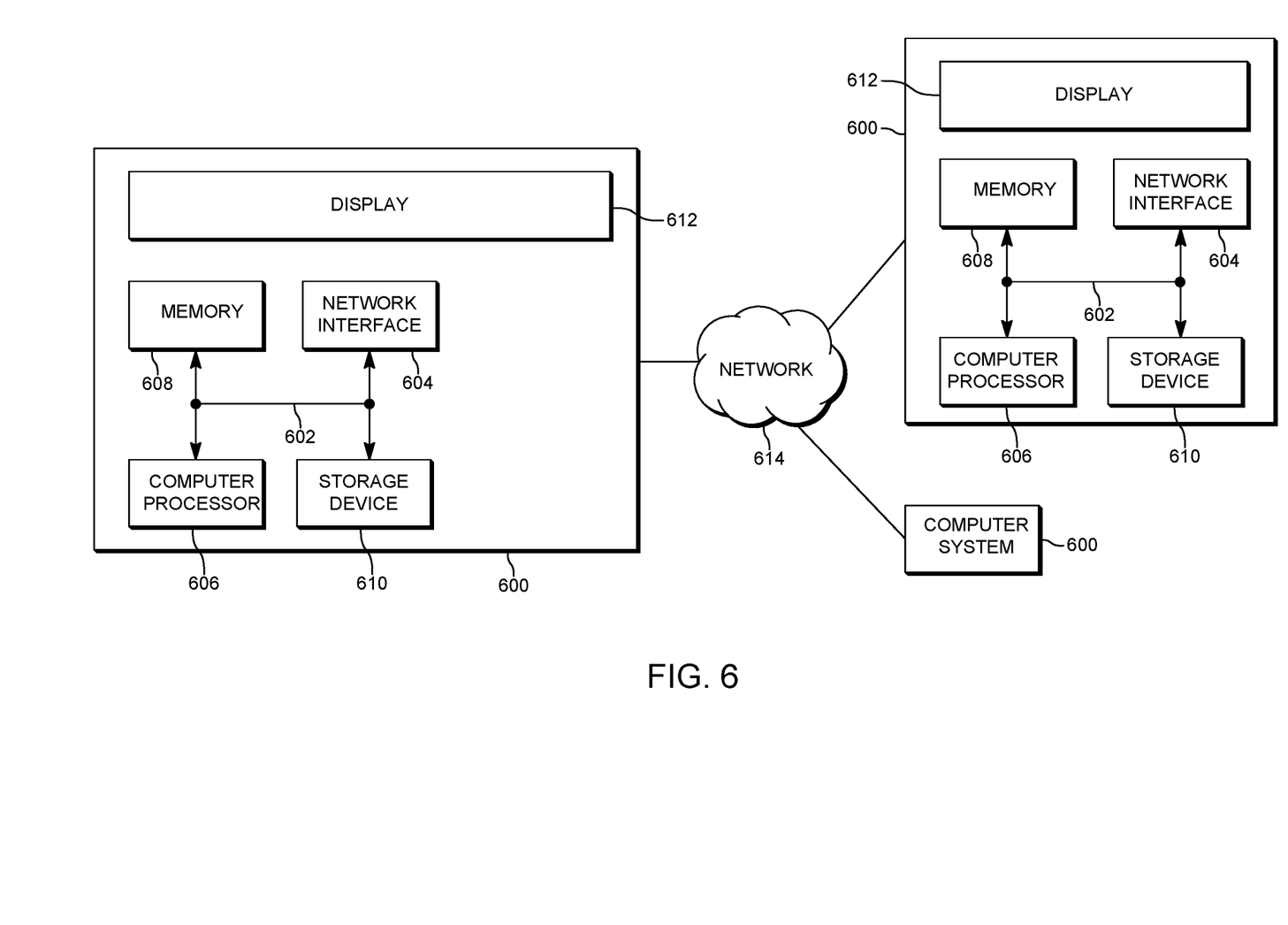
FIG. 6 illustrates an example of special purpose computer systems according to some embodiments.

FIG. 6 illustrates an example of special purpose computer systems 600 according to some embodiments. Computer system 600 includes a bus 602, network interface 604, a computer processor 606, a memory 608, a storage device 610, and a display 612.

Bus 602 may be a communication mechanism for communicating information. Computer processor 606 may execute computer programs stored in memory 608 or storage device 610. Any suitable programming language can be used to implement the routines of some embodiments including C, C++, Java, assembly language, etc. Different programming techniques can be employed such as procedural or object oriented. The routines can execute on a single computer system 600 or multiple computer systems 600. Further, multiple computer processors 606 may be used.

Memory 608 may store instructions, such as source code or binary code, for performing the techniques described above. Memory 608 may also be used for storing variables or other intermediate information during execution of instructions to be executed by processor 606. Examples of memory 608 include random access memory (RAM), read only memory (ROM), or both.

Storage device 610 may also store instructions, such as source code or binary code, for performing the techniques described above. Storage device 610 may additionally store data used and manipulated by computer processor 606. For example, storage device 610 may be a database that is accessed by computer system 600. Other examples of storage device 610 include random access memory (RAM), read only memory (ROM), a hard drive, a magnetic disk, an optical disk, a CD-ROM, a DVD, a flash memory, a USB memory card, or any other medium from which a computer can read.

Memory 608 or storage device 610 may be an example of a non-transitory computer-readable storage medium for use by or in connection with computer system 600. The non-transitory computer-readable storage medium contains instructions for controlling a computer system 600 to be configured to perform functions described by some embodiments. The instructions, when executed by one or more computer processors 606, may be configured to perform that which is described in some embodiments.

Computer system 600 includes a display 612 for displaying information to a computer user. Display 612 may display a user interface used by a user to interact with computer system 600.

Computer system 600 also includes a network interface 604 to provide data communication connection over a network, such as a local area network (LAN) or wide area network (WAN). Wireless networks may also be used. In any such implementation, network interface 604 sends and receives electrical, electromagnetic, or optical signals that carry digital data streams representing various types of information.

Computer system 600 can send and receive information through network interface 604 across a network 614, which may be an Intranet or the Internet. Computer system 600 may interact with other computer systems 600 through network 614. In some examples, client-server communications occur through network 614. Also, implementations of some embodiments may be distributed across computer systems 600 through network 614.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a first receiver in a plurality of receivers, a signal from a satellite transmission via a unicable line, wherein the unicable The connects the plurality of receivers to an interface that receives multiple inputs from a satellite reflector dish;
   generating, by the first receiver, a first unicable message for delivery on the unicable line;
   detecting, by the first receiver, a characteristic on the unicable line to determine whether a second unicable message from a second receiver in the plurality of receivers is being sent on the unicable;
   when the second unicable message is detected, delaying, by the first receiver, transmission of the first unicable message by a time period of at least 50 ms;
   when the second unicable message is not detected, transmitting, by the first receiver, the first unicable message on the unicable line; and
   wherein detecting the characteristic on the unicable line to determine whether the second unicable messa e from the second receiver in the plurality of receivers is being sent on the unicable line comprises:
   receiving a voltage level on the unicable line at a first input to a comparator; receiving a reference voltage at a second input of the comparator; and outputting, from the comparator, a detection signal indicating whether the second unicable message is being sent on the unicable line.

2. The method of claim 1, wherein detecting the characteristic on the unicable line to determine whether the second unicable message from the second receiver in the plurality of receivers is being sent on the unicable line comprises:
   detecting a voltage level on the unicable line; and
   determining whether the second unicable message is being sent based on the voltage level.

3. The method of claim 2, wherein determining whether the second unicable signal is being sent based on the voltage level comprises:
   comparing the voltage level to a threshold;
   determining that the second unicable message is being sent when the voltage level meets the threshold; and
   determining that the second unicable message is not being sent when the voltage level does not meet the threshold.

4. The method of claim 2, wherein:
   the voltage level is between a range of 17 volts to 19 volts when the second unicable message is being sent on the unicable line, and
   the voltage level is between a range of 12.5 volts to 14 volts when the second unicable message is not being sent on the unicable line.

5. The method of claim 1, wherein detecting the characteristic on the unicable line to determine whether the second unicable message from the second receiver in the plurality of receivers is being sent on the unicable line comprises:
   detecting a tone on the unicable line; and
   determining whether the second unicable message is being sent based on the detecting of the tone.

6. The method of claim 1, wherein detecting the characteristic on the unicable line to determine whether the second unicable message from the second receiver in the plurality of receivers is being sent on the unicable line comprises:
   outputting a detection signal indicating whether the second unicable message is being sent to logic that is operable to transmit the first unicable message.

7. The method of claim 1, further comprising receiving an input, wherein the input causes the generation of the first unicable message.

8. The method of claim 1, wherein the signal comprises a first signal for a first channel, and the first unicable message is a command to the interface to switch from receiving the first signal to receiving a second signal for a second channel.

9. The method of claim 1, wherein delaying transmission of the first unicable message by the time period comprises:
   delaying the time period;
   detecting, by the first receiver, the characteristic on the unicable line to determine whether the second unicable message or another unicable message from the second receiver or another receiver in the plurality of receivers is being sent on the unicable line;
   when the second unicable message or the another unicable message is detected, delaying, by the first receiver, transmission of the first unicable message by another time period; and
   when the second unicable message or another unicable message is not detected, transmitting, by the first receiver, the first unicable message on the unicable line.

10. The method of claim 1, wherein the multiple inputs from the satellite are multiple inputs from low noise blocks of the satellite reflector dish that is receiving the satellite transmission.

11. The method of claim 1, wherein the interface includes a plurality of connectors to receive a plurality of cables from low noise blocks of the satellite reflector dish and a single connector to receive the unicable line.

12. The method of claim 1, wherein transmitting the first unicable message on the unicable line comprises changing the characteristic on the unicable line to indicate that the first unicable message is being sent on the unicable line.

13. The method of claim 12, wherein transmitting the first unicable message on the unicable line comprises pulling a voltage on the unicable line from a first voltage range to a second voltage range before transmitting the first unicable message.

14. A non-transitory computer-readable storage medium containing instructions that, when executed, control a first receiver to be operable for:
   receiving, by the first receiver in a plurality of receivers, a signal from a satellite transmission via a unicable line, wherein the unicable line connects the plurality of receivers to an interface that receives multiple inputs from a satellite reflector dish:
   generating, by the first receiver, a first unicable message for delivery on the unicable line;
   detecting, by the first receiver, a characteristic on the unicable line to determine whether a second unicable message from a second receiver in the plurality of receivers is being sent on the unicable line;
   when the second unicable message is detected, delaying, by the first receiver, transmission of the first unicable message by a time period of at least 50 ms;
   when the second unicable message is not detected, transmitting, by the first receiver, the first unicable message on the unicable line; and wherein detecting the characteristic on the unicable line to determine whether the second unicable message from the second receiver in the plurality of receivers is being sent on the unicable line comprises:
receiving a voltage level on the unicable line at a first input to a comparator; receiving a reference voltage at a second input of the comparator; and outputting, from the comparator, a detection signal indicating whether the second unicable message is being sent on the unicable line.

15. The non-transitory computer-readable storage medium of claim 14, wherein detecting the characteristic on the unicable line to determine whether the second unicable message from the second receiver in the plurality of receivers is being sent on the unicable line comprises:
detecting a voltage level on the unicable line; and
determining whether the second unicable message is being sent based on the voltage level.

16. The non-transitory computer-readable storage medium of claim 15, wherein determining whether the second unicable signal is being sent based on the voltage level comprises:
comparing the voltage level to a threshold;
determining that the second unicable message is being sent when the voltage level meets the threshold; and
determining that the second unicable message is not being sent when the voltage level does not meet the threshold.

17. The non-transitory computer-readable storage medium of claim 14, wherein detecting the characteristic on the unicable line to determine whether the second unicable message from the second receiver in the plurality of receivers is being sent on the unicable line comprises:
detecting a tone on the unicable line; and
determining whether the second unicable message is being sent based on the detecting of the tone.

18. A first receiver comprising one or more computer processors and a non-transitory computer-readable storage medium comprising instructions, that when executed, control the one or more computer processors to be operable for:
receiving, by the first receiver in a plurality of receivers, a signal from a satellite transmission via a unicable line, wherein the unicable line connects the plurality of receivers to an interface that receives multiple inputs from a satellite reflector dish;
generating, by the first receiver, a first unicable message for delivery on the unicable line;
detecting, by the first receiver, a characteristic on the unicable line to determine whether a second unicable message from a second receiver in the plurality of receivers is being sent on the unicable line;
when the second unicable message is detected, delaying, by the first receiver, transmission of the first unicable message by a time period of at least 50 ms;
when the second unicable message is not detected, transmitting, by the first receiver, the first unicable message on the unicable line; and
wherein detecting the characteristic on the unicable line to determine whether the second unicable message from the second receiver in the plurality of receivers is being sent on the unicable line comprises:
receiving a voltage level on the unicable line at a first input to a comparator; receiving a reference voltage at a second input of the comparator; and outputting, from the comparator, a detection signal indicating whether the second unicable message is being sent on the unicable line.

* * * * *